US 8,948,753 B2

(12) United States Patent
Liu et al.

(10) Patent No.: US 8,948,753 B2
(45) Date of Patent: Feb. 3, 2015

(54) METHOD OF PROVIDING NOTIFICATION OF ABNORMAL CONDITIONS DURING NON-ACCESS STRATUM (NAS) MESSAGE TUNNELING

(75) Inventors: Jennifer J. N. Liu, Plano, TX (US); Michael Edwards, Plainfield, IL (US); Frances Chin, Naperville, IL (US); John Gafrick, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 1052 days.

(21) Appl. No.: 12/824,695

(22) Filed: Jun. 28, 2010

(65) Prior Publication Data

US 2011/0269457 A1 Nov. 3, 2011

Related U.S. Application Data

(60) Provisional application No. 61/330,174, filed on Apr. 30, 2010.

(51) Int. Cl.
*H04W 4/00* (2009.01)
*H04W 8/06* (2009.01)
*H04W 8/30* (2009.01)

(52) U.S. Cl.
CPC .. *H04W 8/06* (2013.01); *H04W 8/30* (2013.01)
USPC ........................................ 455/435.1; 455/433

(58) Field of Classification Search
USPC ............ 455/428, 432.1–436, 433, 466, 435.1
See application file for complete search history.

(56) References Cited

U.S. PATENT DOCUMENTS 8,711,775 B2 * 4/2014 Lair .............................. 370/328
2010/0265884 A1 * 10/2010 Vikberg et al. ............... 370/328

FOREIGN PATENT DOCUMENTS

WO WO 2009/0562932 5/2009
WO WO 2011/059646 5/2011

OTHER PUBLICATIONS

3GPP TS 29.118 V9.1.0 (Mar. 31, 2010) 3rd Generation Partnership Project; Technical Specification Group Core Network and Terminals; Mobility Management Entity (MME)—Visitor Location Register (VLR) SGs interface specification (Release 9). pp. 1-55.*
3GHH IS29.118 V9.1.0 (Mar. 31, 2010) 3rd Generation Partnership Project; Technical Specification Group Core Network and Terminals; Mobility Management Entity (MME)—Visitor Location Register (VLR) SGs interface specification (Release 9). pp. 1-55.*
International Search Report PCT/US2011/032209 dated Jun. 27, 2011.
Written Opinion dated Jun. 27, 2011.

(Continued)

*Primary Examiner* — Brandon Miller
(74) *Attorney, Agent, or Firm* — Davidson Sheehan LLP (57) ABSTRACT

The present invention provides a method that includes generating, in response to a non-access stratum (NAS) message transmitted between a mobility management entity and a visiting location register, a response message including information indicating a message type, an identifier of a mobile unit associated with the NAS message, and a cause associated with generating the response message. The method also includes transmitting the response message.

20 Claims, 4 Drawing Sheets

(56) References Cited

OTHER PUBLICATIONS

Alcatel-Lucent: Discussion on Failure Notification for NAS Message Tunneling Procedure, 3GPP Draft; Mobile Competence Centre; 650, Route DES Lucioles; F-06921 Sophia-Antipolis Cedex, France, vol. CT WG1, No. Dublin; Jul. 2, 2010, Jul. 5, 2010; XP050443360 the whole document.

3GPP: "3$^{rd}$ Generation Partnership Project; Technical Specification Group Core Network and Terminals; Mobility Management Entity (MME) a Visitor Location Register (VLR) SGs interface specification (Release 9)", 3GPP Standard; 3GPP TS 29.118, 3$^{rd}$ Generation Partnership Project (3GPP), Mobile Competence Centre; 650, Route DES Lucioles; F-06921 Sophia-Antipolis Cedex; France, No. V9.1.0, (Mar. 31, 2010), pp. 1-55, XP050402254, [retrieved on Mar. 31, 2010] paragraphs [7], [8.18].

* cited by examiner

METHOD OF PROVIDING NOTIFICATION OF ABNORMAL CONDITIONS DURING NON-ACCESS STRATUM (NAS) MESSAGE TUNNELING

CROSS REFERENCE TO RELATED APPLICATIONS

This application claims priority to U.S. Provisional Patent Application 61/330,174, filed on Apr. 30, 2010.

BACKGROUND OF THE INVENTION

1. Field of the Invention

This invention relates generally to communication systems, and, more particularly, to wireless communication systems.

2. Description of the Related Art

Wireless communication networks typically implement a main database to store subscriber information such as the International Mobile Subscriber Identities (IMSIs) for the users that are registered for communication within the system. The database can also include other information about the user, the users account, and/or user preferences for various communications. One example of a main database is a home location register (HLR) that can be maintained by the subscriber's home carrier or another network operator. The home location register typically interacts with a mobile switching center to control and/or process calls associated with the subscribers. Similar databases can also be used to temporarily store information related to mobile units or user equipment that have roamed out of their home network and into a visited network. One example of a visitor database is a visiting location register (VLR) that maintains temporary information for subscribers that are roaming into the visited network.

Evolved packet-switched networks such as Long Term Evolution (LTE) networks are being developed in accordance with 3GPP standards and/or protocols. The System Architecture Evolution (SAE) is an example of a core network architecture for an all-IP network. The SAE implements an Evolved Packet Core (EPC) that handles mobility within the network. One subcomponent of the EPC is a mobility management entity (MME) that is responsible for procedures in the idle mode such as tracking and paging mobile units including retransmissions. The MME can interact with a home subscriber server to authenticate mobile units and can terminate non-access stratum (NAS) signaling. The MME can also generate and allocate temporary identities to roaming mobile units. The MME can function as the termination point in the network for ciphering/integrity protection for NAS signaling. The MME and the VLR communicate over an interface that is conventionally referred to as an SGs interface.

When a mobile unit roams into an area served by a particular MME, the MME and the appropriate VLR establish an association that allows a mobile unit to send and receive messages via the MME and the VLR. Both the MME and the VLR include data that defines and identifies the association. Once an SGs Association has been established between the MME and the VLR, the MME and/or the VLR can use the SGs Interface to transmit uplink and/or downlink NAS messages associated with the mobile unit. For example, a mobile-originated short message service (SMS-MO) message can be transmitted from the mobile unit to the MME as a payload of an NAS message using an SGs-UPLINK-UNITDATA message. The MME uses the association data to transmit this message to the VLR, which uses its copy of the association data and the related user information to forward the SMS-MO message. For another example, a mobile-terminated SMS message can be received at the VLR, which uses its copy of the association data and the related user information to convey the SMS-MT message to the appropriate MME for forwarding to the mobile unit.

Various errors and/or network operations may cause full or partial data loss on either the MME side or VLR side of the SGs interface. The full or partial data loss can cause a loss of synchronization between the association data and/or user information data stored by the MME and the serving VLR. For example, VLR restarts may result in complete loss of the association and/or user information data stored by the VLR. For another example, restarts of the MME may result in full data loss of the association and/or user information data stored by the MME. For yet another example, some or all of the IMSI records may be lost and/or corrupted in portions of a distributed VLR architecture. The lack of synchronization between the association and/or user information data store by the MME and the serving VLR may result in abnormal conditions during the exchange of messages, e.g., during the exchange of NAS messages such as SMS-MO and SMS-MT messages.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided that includes generating, in response to a non-access stratum (NAS) message transmitted between a mobility management entity and a visiting location register, a response message including information indicating a message type, an identifier of a mobile unit associated with the NAS message, and a cause associated with generating the response message. The method also includes transmitting the response message.

In another embodiment, a method is provided that includes receiving, in response to a non-access stratum (NAS) message transmitted between a mobility management entity and a visiting location register, a response message including information indicating a message type, an identifier of a mobile unit associated with the NAS message, and a cause associated with generating the response message. The method also includes performing at least one corrective action for the mobility management entity or the visiting location register based on the cause indicated in the response message.

BRIEF DESCRIPTION OF THE DRAWINGS

The disclosed subject matter may be understood by reference to the following description taken in conjunction with the accompanying drawings, in which like reference numerals identify like elements, and in which.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
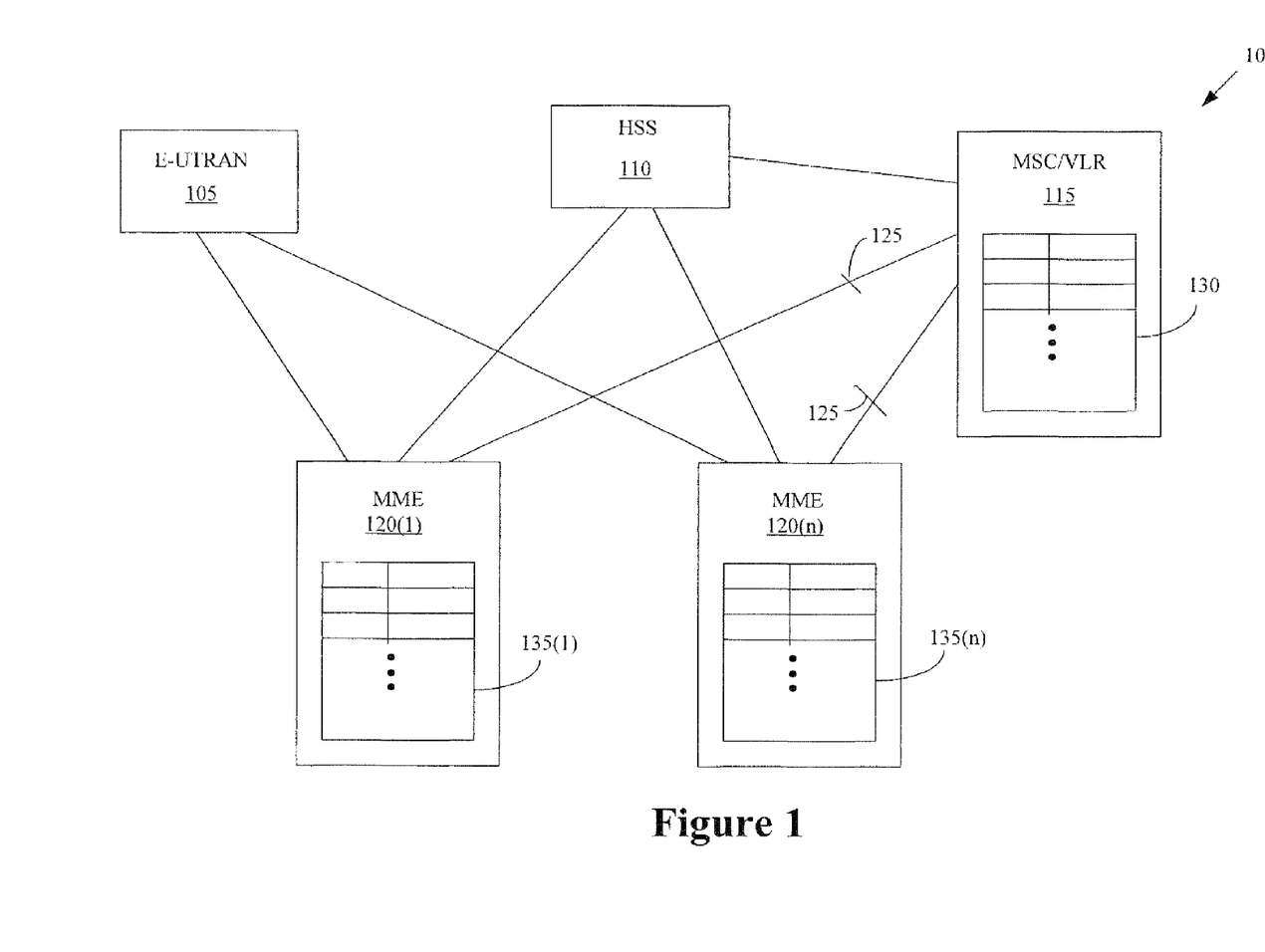
FIG. 1 conceptually illustrates a first exemplary embodiment of a communication system.

FIG. 1 conceptually illustrates a first exemplary embodiment of a communication system 100. In the illustrated embodiment, the communication system 100 includes an access network 105 for providing wireless connectivity to the system 100. The access network 105 depicted in FIG. 1 is an evolved UMTS terrestrial radio access network (E-UTRAN) that operates according to the 3GPP standards and/or protocols defined for the Long Term Evolution (LTE) upgrade path for mobile networks. However, persons of ordinary skill in the art having benefit of the present disclosure should appreciate that other types of base stations, base station routers, access points, and the like may be used to provide wireless connectivity to alternative embodiments of the system 100. The communication system also includes one or more home subscriber servers (HSSs) 110, which may also be referred to as User Profile Server Functions (UPSF). The HSS 110 is a master user database that contains subscription-related information for users, performs authentication and authorization of the users, and can provide information about the subscriber's location and IP information.

In the illustrated embodiment, the communication system 100 also includes one or more mobile switching center/visiting location registers (MSC/VLR) 115 that maintains temporary information for subscribers that a roaming into the visited network. The MSC/VLR 115 may also include functionality for connecting the wireless communication system to the public switched telephone network. One or more mobility management entities (MMEs) 120(1-n) are also included in the communication system 100. The mobility management entities 120 can interact with the home subscriber server 110 to authenticate mobile units and can terminate non-access stratum (NAS) signaling. The mobility management entities 120 are also electronically and/or communicatively coupled with the MSC/VLR 115 over the interfaces 125, which may be referred to as SGs interfaces 125.

Associations can be established between the MSC/VLR 115 and the mobility management entities 120 for user equipment or mobile units that are associated with the different mobility management entities 120. The MSC/VLR 115 and the mobility management entities 120 include databases 130, 135 that are used to store information defining the associations. The databases 130, 135 can also include information identifying the associated mobile units, such as international mobile subscriber identifiers (IMSIs). Both the mobility management entity 120 and the MSC/VLR 115 that support each association for each mobile unit store information identifying the association for each mobile unit. The information can be used to deliver non-access stratum (NAS) messages between these entities. For example, short messaging service messages are one type of NAS message that can be exchanged between the mobility management entities 120 and the MSC/VLR 115. When the MSC/VLR 115 receives a mobile-terminated SMS message (SMS-MT), it uses the association information to forward the SMS message to the appropriate MME 120, which uses its association information to identify the registered mobile unit and transmit the SMS message to the mobile unit. Similarly, when the mobility management entity 120 receives a mobile-originated SMS message (SMS-MO), it uses the association information to forward the SMS message to the appropriate MSC/VLR 115 for transmission to the destination network.

To successfully exchange messages associated with mobile units or user equipment, the databases 130, 135 should remain synchronized. For example, the portions of the data stored in the database 135(1) that define associations between the mobility management entity 120(1) and the MSC/VLR 115 should remain synchronized with the corresponding portions of the data stored in the database 130 so that this information refers to the same association for the same mobile unit. Subscriber records sent by the HSS 110 should also remain synchronized between the MME 120 and the VLR 115. However, information in the databases 130, 135 can be corrupted and/or lost so that the databases 130, 135 become unsynchronized, which can lead to error conditions and/or other abnormal conditions during communication between the mobility management entity 120 and the MSC/VLR 115.

Figure 2:
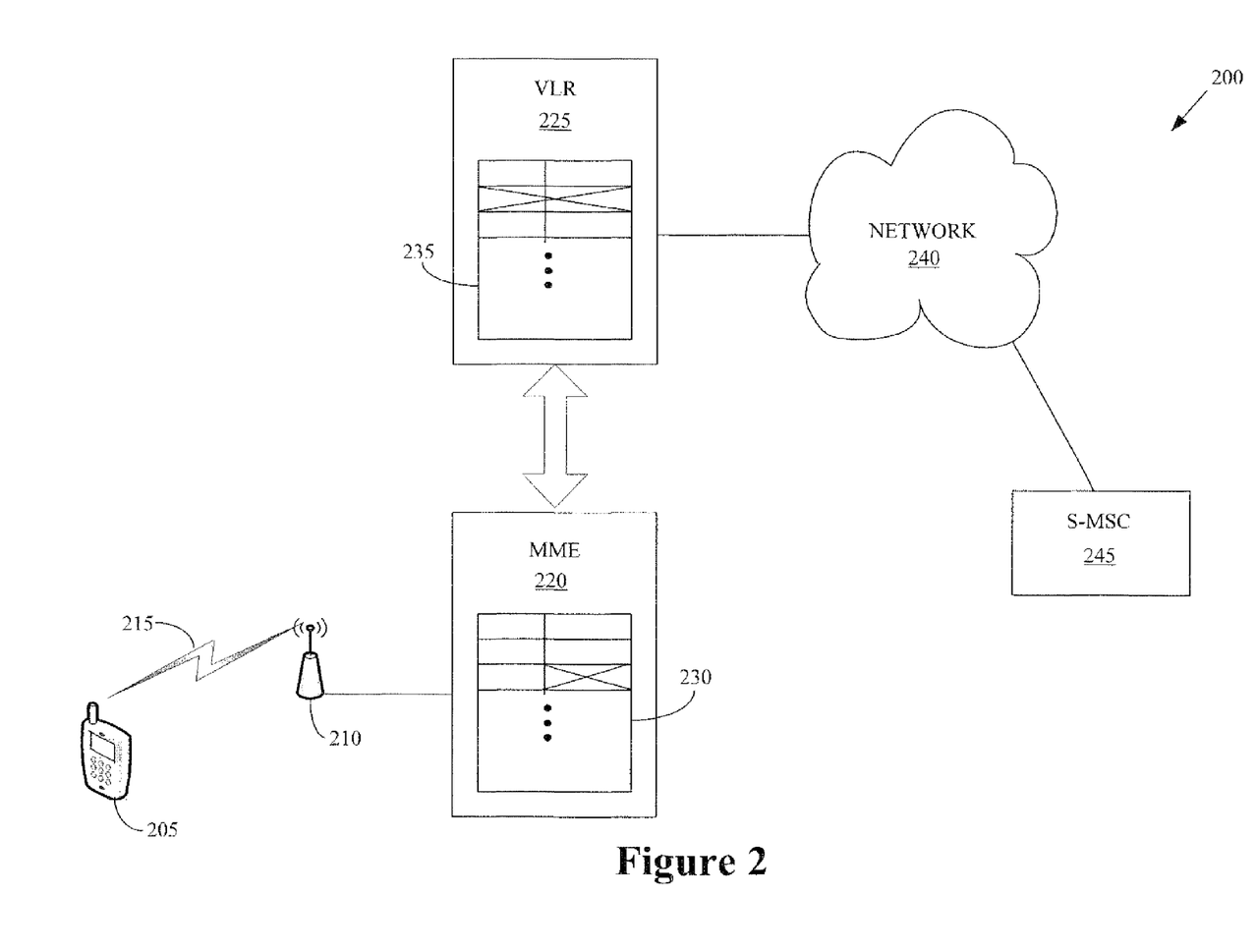
FIG. 2 conceptually illustrates a second exemplary embodiment of a communication system.

FIG. 2 conceptually illustrates a second exemplary embodiment of a communication system 200. In the illustrated embodiment, a mobile unit 205 may establish wireless communication with an access network 210 (which may be an E-UTRAN) over an air interface 215. The access network 210 is electronically and/or communicatively coupled to a mobility management entity 220 that can establish an association with a VLR 225 for the mobile unit 205. As discussed herein, information indicating and/or defining the association (as well as other user information such as an IMSI) can be stored in databases 230, 235 in the mobility management entity 220 and the VLR 225, respectively. The VLR 225 can be electronically and/or communicatively coupled to a network 240, which may be used to support communications with other entities via one or more serving mobile switching centers (S-MSC) 245. Non-access stratum messages can be tunneled between the mobility management entity 220 and the VLR 225 using the association for the mobile unit 205.

The second exemplary embodiment of the communication system 200 operates according to 3GPP standards and/or protocols for LTE. Tunneling of NAS messages may therefore be performed by encapsulating the NAS messages exchanged between the mobile unit 205 and the VLR 225. This procedure can be used by either the VLR 225 or the MME 220 depending on the direction of the NAS message. For example, two procedures may be identified as uplink unitdata in the direction from the MME 220 to the VLR 225 and downlink unitdata in the direction from the VLR 225 to the MME 220.

When the MME 220 receives an Uplink NAS Transport message from the mobile unit 205, the MME 220 may copy the value part of the NAS message container information element to the value part of the NAS message container information element of the SGsAP-UPLINK-UNITDATA message and send the SGsAP-UPLINK-UNITDATA message to the VLR 225. Upon reception of an SGsAP-UPLINK-UNITDATA, the VLR 225 can extract the NAS message container information element and use this information to prepare a message to forward to the network 240. However, corruption and/or loss of information in one or more of the databases 230, 235 can lead to error conditions and/or abnormal conditions that affect the exchange of messages between the MME 220 and the VLR 225.

In one example of an abnormal condition, corruption and/or data loss in the database 235 removes or alters the information indicating an SGs association for the mobile unit 205. If the VLR 225 receives an SGsAP-UPLINK-UNITDATA from the MME 220 for the mobile unit 205, for which no information identifying an SGs association exists at the VLR 225, then the VLR 225 can ignore the received message and return an SGsAP-RELEASE-REQUEST message to MME 220 indicating the cause of the error condition or the abnormal condition. For example, the message may include a SGs cause information element that has a value of "IMSI detached for non-EPS services," which may be indicated by a particular pattern of bits in the message. Once the MME 220 receives the SGsAP-RELEASE-REQUEST message with the SGs cause information element value "IMSI detached for non-EPS services", the MME 220 may take corrective actions including transmitting a request to re-attach to non-EPS services, e.g., upon reception of a Combined Tracking Area update request or a periodic Tracking Area Update from the mobile unit 205. Alternatively, the MME 220 can perform the Location Update for non-EPS services procedure towards the VLR 225 for the mobile unit 205 without waiting for any tracking area updates or other actions by the mobile units 205.

Another example of an abnormal condition on the uplink occurs when a SGs association exists for the mobile unit 205 but the VLR 225 does not know or cannot determine the IMSI of the mobile unit 205, e.g., because of data corruption and/or loss. In that case, when the VLR 225 receives an SGsAP-UPLINK-UNITDATA from the MME 220 for the mobile unit 205, the VLR 225 may return an SGsAP-RELEASE-REQUEST message to MME 220 indicating the SGs cause information element value "IMSI unknown" When the MME 220 receives the SGsAP-RELEASE-REQUEST message with SGs cause information element "IMSI unknown", the MME 225 may take one or more corrective actions including requesting reattachment to non-EPS services upon reception of a Combined Tracking Area update request or a periodic Tracking Area Update from the mobile unit 205. Alternatively, the MME 225 may perform the Location Update for non-EPS services procedure towards the VLR 220 without waiting for tracking area updates or other actions by the mobile unit 205.

For NAS messages traveling in the downlink direction, when the VLR 225 needs to send a NAS message to the mobile unit 205, the VLR 225 may first verify whether or not it has an SGs association for the mobile unit 205. If the state of the SGs association for the mobile unit 205 is SGs-ASSOCIATED and LA-UPDATEPRESENT, then the VLR 225 can continue with the procedure. The VLR 225 may build and encapsulate the NAS message into the value part of the NAS message container information element of an SGsAP-DOWNLINK-UNITDATA message and send the SGsAP-DOWNLINK-UNITDATA message to the MME 220. Upon reception of an SGsAP-DOWNLINK-UNITDATA message, the MME 220 may copy the value part of the NAS message container information element to the value part of the NAS message container information element of a Downlink NAS Transport message and send the Downlink NAS Transport message to the mobile unit 205. However, as in the uplink case, corruption and/or loss of information in one or more of the databases 230, 235 can lead to error conditions and/or abnormal conditions that affect the exchange of messages between the MME 220 and the VLR 225.

In one example of an abnormal condition, corruption and/or data loss in the database 230 removes or alters the information indicating an SGs association for the mobile unit 205. Consequently, information indicating the SGs association for the mobile unit 205 may not be available at the MME 220. If the MME 220 receives an SGsAP-DOWNLINK-UNITDATA message from the VLR 225 for a mobile unit 205 for which there is no information indicating a SGs association, then the MME 220 may ignore the received message and return an SGsAP-RELEASEREQUEST message to VLR 225 indicating the SGs cause information element value "IMSI detached for EPS and non-EPS services." On the VLR side, on receiving SGsAP-RELEASE-REQUEST message with SGs cause information element value "IMSI detached for EPS and non-EPS services", VLR 225 may mark the "Confirmed by Radio Contact" restoration indicator to "false" for the SGs association for this mobile unit 205 and set the state of the SGs association to the SGs-NULL state. For subsequent SMS mobile termination requests to this mobile unit 205, VLR 225 may try SMS delivery using A or Iu interfaces.

Another example of an abnormal condition on the uplink occurs when a SGs association exists for the mobile unit 205 but the MME 220 does not know or cannot determine the IMSI of the mobile unit 205, e.g., because of data corruption and/or loss. If the MME 220 receives an SGsAP-DOWNLINK-UNITDATA message from the VLR 225 for a mobile unit 205 for which SGs association exists, but IMSI is unknown to the MME 220, then the MME 220 may ignore the received message and return an SGsAP-RELEASE-REQUEST message to VLR 225 indicating the SGs cause information element value "IMSI unknown". On the VLR side, on receiving SGsAP-RELEASE-REQUEST message with SGs cause information element "IMSI unknown", VLR 225 may mark the "Confirmed by Radio Contact" restoration indicator to "false" for the SGs association for this mobile unit 205 and set the state of the SGs association to the SGs-NULL state. For subsequent SMS mobile termination requests to this mobile unit 205, the VLR 225 may try SMS delivery using the A or Iu interfaces defined by the relevant standards and/or protocols.

The MME 220 and the VLR 225 may exchange release request messages to release the NAS signaling connection(s) for the mobile units 205. In one embodiment, when the VLR 225 determines that there are no more NAS messages to be exchanged between the VLR 225 and the mobile unit 205, or when further NAS message exchange for the specified IMSI is not possible because the VLR 225 has no SGs association (or cannot find information indicating the association) for that mobile unit 205, or because IMSI of the mobile unit 205 is unknown at the VLR 225, the VLR 225 may send the SGsAP-RELEASE-REQUEST message to the MME 220, including the IMSI (if known) of the mobile unit 205 for which there are no more NAS messages to be tunneled, and the SGsCause Information Element: For normal releasing (for example, following successful SMS transactions), SGs Cause value can be set to "Normal, unspecified". This indication can be used by the MME 220 to control the release of the NAS signaling connection with the mobile unit 205 indicated in the SGsAP-RELEASE-REQUEST message. For releasing due to abnormal cases, SGs Cause can be set as described herein.

In one embodiment, when the MME 220 determines that further NAS message exchange (SGsAP-DOWNLINK-UNITDATA from VLR 225) for the specified IMSI is not possible because the MME 220 has no SGs association (or cannot determine are located information identifying the association) for that mobile unit 205, or because IMSI of the mobile unit 205 is unknown at the MME 220, the MME 220 may send the SGsAP-RELEASE-REQUEST message to the VLR 225, including the IMSI (if known) of the mobile unit 205 for which there are no more NAS messages to be tunneled, and the SGsCause Information Element with SGs Cause value set as described herein. In some embodiments, for the SMS transport, the VLR 225 can send the SGsAP-RELEASE-REQUEST message when the SMS transaction is complete (reception of a CP-ACK message for the MO case, sending of a CP-ACK message for the MT case), upon reception of a CP-ERROR message, abort of SMS transaction by upper layers, or upon some error cases such as TC1 expiry, no SGs association for the mobile unit 205 or IMSI unknown.

Table 1 shows a conventional release request message. The message shown in Table 1 includes an information element indicating the message type and another information element indicating the IMSI of the user equipment are mobile unit for which the association has been established.

TABLE 1

Conventional SGsAP-RELEASE-REQUEST message content

| Information element | Type/Reference | Presence | Format | Length |
|---|---|---|---|---|
| Message type | Message type 9.2 | M | V | 1 |
| IMSI | IMSI 9.4.6 | M | TLV | 6-10 |

Table 2 shows one embodiment of a release request message that can be used to provide responses when the mobility management entities and/or visiting location registers detect error conditions or abnormal conditions in response to receiving NAS messages. In the illustrated embodiment, the release request message includes an information element that indicates a message type, an information element that identifies the mobile unit (e.g., an IMSI), and another information element that indicates a cause associated with generating the release response message such as an error condition for an abnormal condition. This message can be sent by both the VLR 225 and the MME 220 as desired. The VLR 225 sends the SGsAP-RELEASE-REQUEST message to the MME 220 either when the VLR 225 determines that there are no more NAS messages to be exchanged between the VLR 225 and the mobile unit 205, or when further NAS message exchange (SGsAP-UPLINK-UNITDATA from MME) for the specified IMSI is not possible because the VLR 225 has no SGs association (or cannot determine or locate the information identifying the association) for that mobile unit 205, or because IMSI is unknown at the VLR 225. The MME 220 sends the SGsAP-RELEASE-REQUEST message to the VLR 225 when further NAS message exchange (SGsAP-DOWNLINK-UNITDATA from VLR 225) for the specified IMSI is not possible because the MME 220 has no SGs association for that mobile unit 205, or because IMSI of the mobile unit 205 is unknown at the MME 220.

TABLE 2

SGsAP-RELEASE-REQUEST message content

| Information element | Type/Reference | Presence | Format | Length |
|---|---|---|---|---|
| Message type | Message type 9.2 | M | V | 1 |
| IMSI | IMSI 9.4.6 | M | TLV | 6-10 |
| SGs cause | SGs cause 9.4.18 | O | TLV | 3 |

Table 3 illustrates the structure of one exemplary embodiment of the information element that is used to indicate the cause associated with the release request message and Table 4 is a list of the bit values that indicate different causes for one exemplary embodiment of the information element.

TABLE 3

SGs cause information element

| | 8 | 7 | 6 | 5 | 4 | 3 | 2 | 1 |
|---|---|---|---|---|---|---|---|---|
| Octet 1 | | | | IEI | | | | |
| Octet 2 | | | | Length indicator | | | | |
| Octet 3 | | | | SGs cause value | | | | |

TABLE 4

SGs cause information element value part
SGs cause value (octet 3)

| Bits 8 7 6 5 4 3 2 1 | |
|---|---|
| 0 0 0 0 0 0 0 0 | Normal, unspecified in this version of the protocol. |
| 0 0 0 0 0 0 0 1 | IMSI detached for EPS services |
| 0 0 0 0 0 0 1 0 | IMSI detached for EPS and non-EPS services |
| 0 0 0 0 0 0 1 1 | IMSI unknown |
| 0 0 0 0 0 1 0 0 | IMSI detached for non-EPS services |
| 0 0 0 0 0 1 0 1 | IMSI implicitly detached for non-EPS services |
| 0 0 0 0 0 1 1 0 | UE unreachable |
| 0 0 0 0 0 1 1 1 | Message not compatible with the protocol state |
| 0 0 0 0 1 0 0 0 | Missing mandatory information element |
| 0 0 0 0 1 0 0 1 | Invalid mandatory information |
| 0 0 0 0 1 0 1 0 | Conditional information element error |

TABLE 4-continued

SGs cause information element value part
SGs cause value (octet 3)

Bits
8 7 6 5 4 3 2 1

0 0 0 0 1 0 1 1   Semantically incorrect message
0 0 0 0 1 1 0 0   Message unknown
0 0 0 0 1 1 0 1   Mobile terminating CS fallback call rejected by the user
0 0 0 0 1 1 1 0   IMSI detached for EPS and non-EPS services due to MME Reset
0 0 0 1 0 0 0 0   Normal Clearing, CSFB Call
0 0 0 0 1 1 1 1   Normal, unspecified in this version of the protocol
0 0 0 1 0 0 0 1   Normal, unspecified in this version of the protocol
to
1 1 1 1 1 1 1 1

NOTE:
"Normal, unspecified" has the same meaning as in 3GPP TS 24.008, informative Annex H (UMTS specific cause values for call control). It is used to report a normal event, and should not be interpreted as syntactically incorrect nor unknown if received.

For the specific case of SMS transport, the VLR can send the SGsAP-RELEASE-REQUEST message when the SMS transaction is complete (e.g., reception of a CP-ACK message for the MO case, sending of a CP-ACK message for the MT case), upon reception of a CP-ERROR message, abort of SMS transaction by upper layers, or upon some error cases such as TC1 expiry. This indication can be used by the MME to control the release of the NAS signaling connection with the UE indicated in the SGsAP-RELEASE-REQUEST message. In one embodiment, usage of Release Procedure may be extended to cover failure notification and resource clean up for the abnormal call termination. In another embodiment, the Release Procedure can be made available for failure notification and resource clean up of the abnormal call from MME side.

Figure 3:
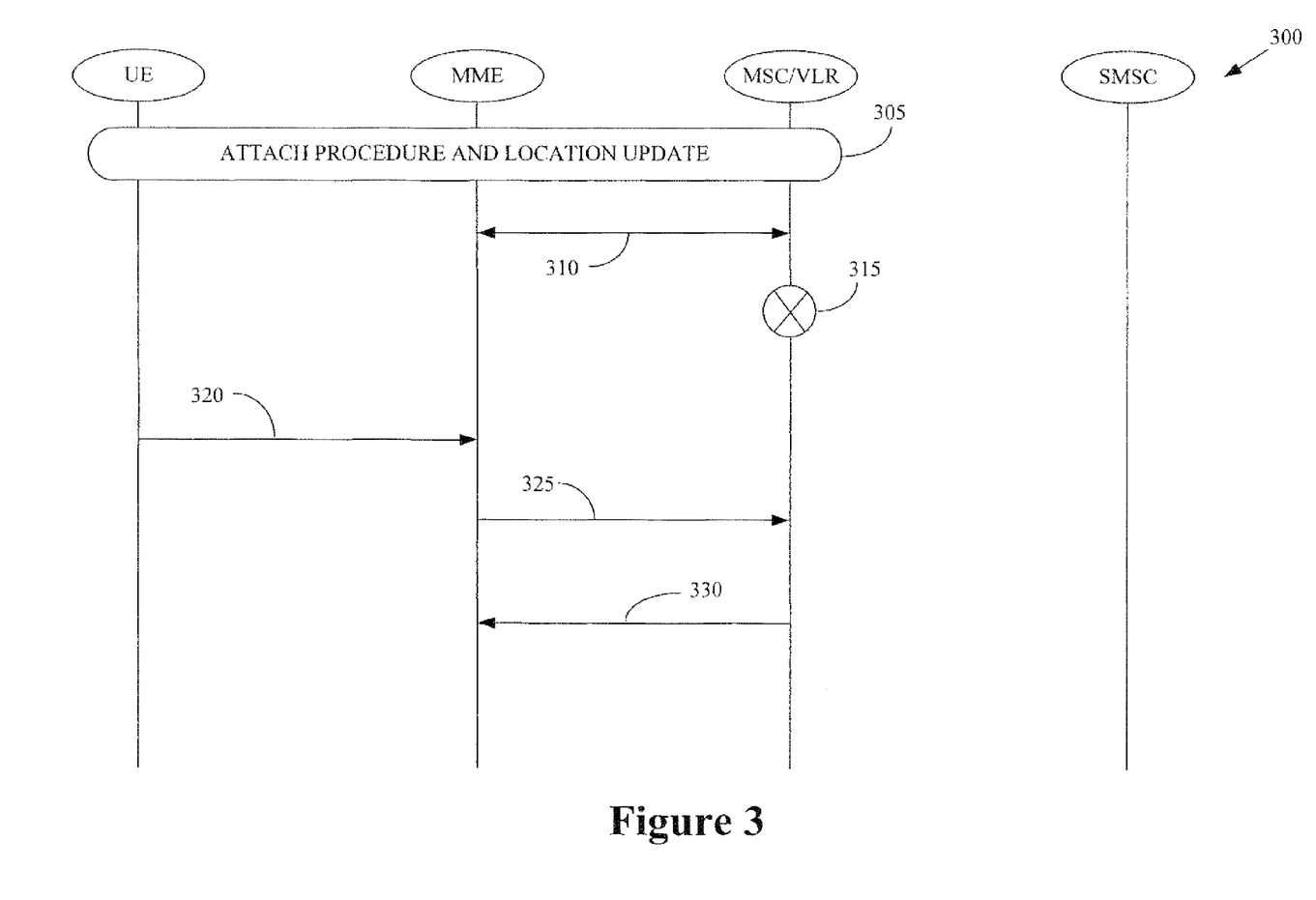
FIG. 3 conceptually illustrates one exemplary embodiment of a method for generating a response to abnormal conditions at a VLR.

FIG. 3 conceptually illustrates one exemplary embodiment of a method 300 for generating a response to abnormal conditions at a VLR. In the illustrated embodiment, a combined EPS/IMSI attach procedure and location update is performed (at 305) for a non-EPS services procedure. A SGs association is then established (at 310) at the MME and the VLR and this association is represented using information that is stored in both the MME and the VLR. In the illustrated embodiment, data stored at the VLR is corrupted and/or lost (at 315). For example, the association data may not be present on the VLR. For another example, the association data may be present but no corresponding subscriber record may be available, e.g., the indicator "Subscriber Data Confirmed by HSS" may have a value "Not Confirmed." Subsequently, user equipment (UE) then sends (at 320) an uplink NAS transport message such as a mobile-originated SMS message. The MME uses the association information and the information identifying the user equipment to forward (at 325) the received NAS message to the VLR.

One conventional response when a MO-SMS arrives at the MSC/VLR over the SGs interface with no indication of establishment of SGs Association (no SGs Association Data) is to ignore the message. For example, the VLR may ignore the message if there is no SGs association for the UE at the VLR and/or if the VLR receives an SGsAP-UPLINK-UNITDATA from the MME for a UE for which no SGs association exists. If the incoming message is ignored, the MSC/VLR does not send any failure notification to the MME. On the MME, there is no timer associated with this mobile originated SMS either. Therefore, there is no way for the MME to know this originated SMS was not delivered. In addition, the MME also thinks the association with the 3G-MSC/VLR for the UE is still associated and so the MME continues to pass the UE originated SMS to the 3G-MSC in the future. This "unknown" situation can last up to a couple hours or longer without notices.

The method 300 therefore implements an alternative embodiment that allows the MME to take a corrective action such as re-registering the user equipment with the VLR to recover the association status. In the illustrated embodiment, when SGs association data is not present on the VLR, the VLR notifies (the 330) the MME by sending a Release Request to MME including an information element that indicates that the call is not successful due to SGs Association State being SGs-NULL (e.g., due to IMSI detached for non-EPS services). For example, If the VLR receives an SGsAP-UPLINK-UNITDATA from the MME for a mobile unit for which no SGs association exists, then the VLR can ignore the received message and return an SGsAP-RELEASE-REQUEST message to MME indicating the SGs cause information element value "IMSI detached for non-EPS services." On the MME side, on receiving SGsAP-RELEASE-REQUEST message with SGs cause information element value "IMSI detached for non-EPS services", the MME may request the re-attach to non-EPS services upon reception of a Combined Tracking Area update request or a periodic Tracking Area Update from the UE, or alternatively immediately perform the Location Update for non-EPS services procedure towards the VLR for the UE Alternatively, when subscriber data is not confirmed by a home subscription server on the VLR due to the data corruption and/or loss, the VLR notifies (at 330) the MME so that the MME can take corrective actions. One exemplary corrective action is for the VLR to retrieve the information from the home subscriber server. In this case, when a VLR receives an SGsAP-LOCATION-UPDATE-REQUEST message, the VLR can check whether the IMSI is known. If the IMSI is not known, the VLR may retrieve the MM context of the UE from the HSS. The VLR could also retrieve the context without waiting for any UE actions, e.g., substantially immediately in response to detecting the error or abnormal condition. Another exemplary corrective action is for the VLR to send (at 330) a Release Request (as service cannot be verified) to the MME to indicate that the call is not successful due to unknown subscriber and wait for next attach or combined tracking area update which may eventually trigger the IMSI info retrieval from HSS. For example, If the VLR receives an SGsAP-UPLINK-UNITDATA from the MME for a mobile unit for which SGs association exists, but the indicator "Subscriber Data Confirmed by HSS" is "Not Confirmed", then the VLR can return an SGsAP-RELEASE-REQUEST message to MME indicating the SGs cause information element value "IMSI unknown". On the MME side, on receiving SGsAP-RELEASE-REQUEST message with SGs cause information element "IMSI unknown", the MME may request re-attachment to non-EPS services upon reception of a Combined Tracking Area update request or a periodic Tracking Area Update from the mobile unit, or alternatively immediately perform the Location Update for non-EPS services procedure towards the VLR for the mobile unit.

Figure 4:
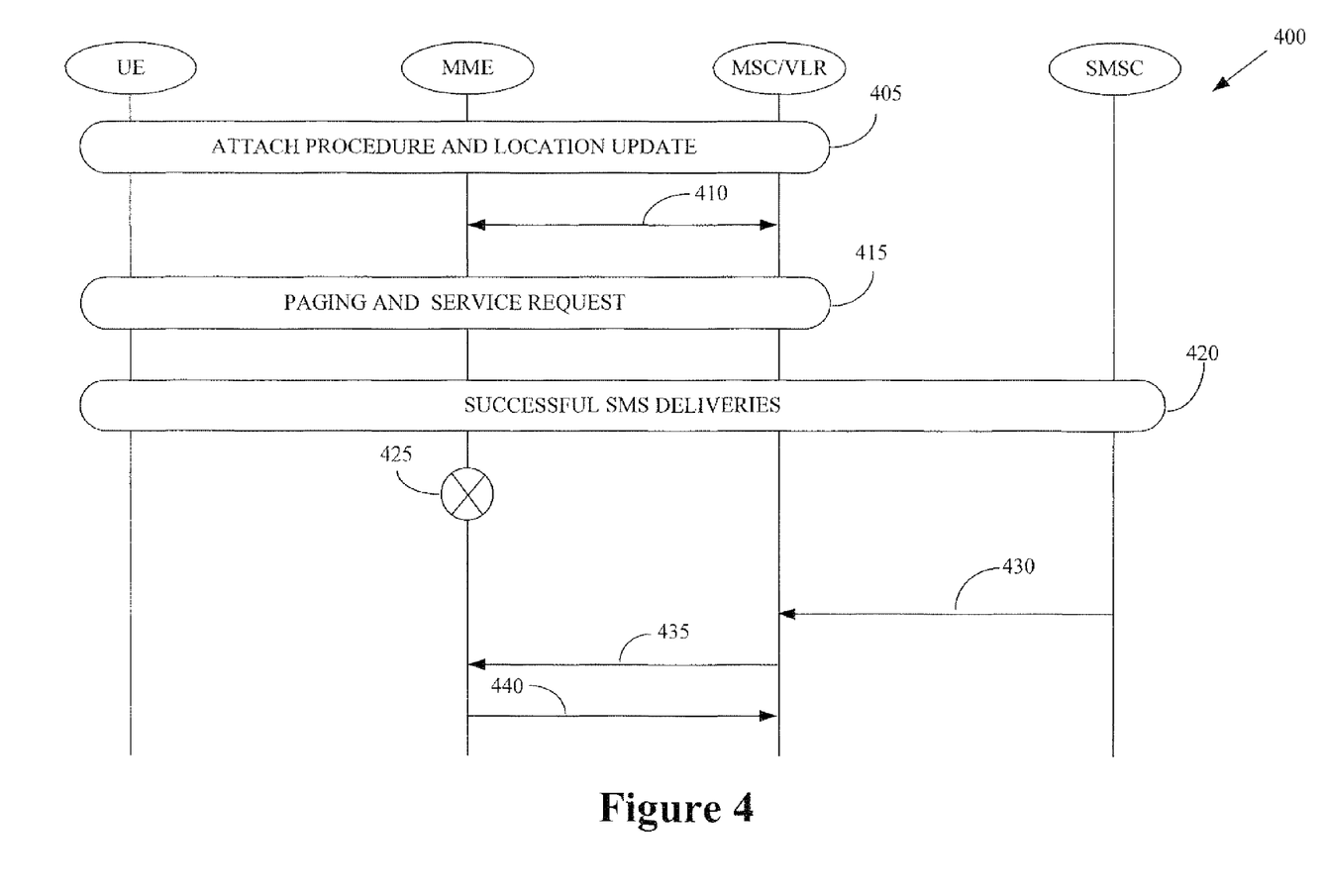
FIG. 4 conceptually illustrates one exemplary embodiment of a method for generating a response to abnormal conditions at an MME.

FIG. 4 conceptually illustrates one exemplary embodiment of a method 400 for generating a response to abnormal conditions at an MME. In the illustrated embodiment, a combined EPS/IMSI attach procedure and location update is performed (at 405) for a non-EPS services procedure. A SGs association is then established (at 410) at the MME and the VLR and this association is represented using information that is stored in both the MME and the VLR. Paging and service request procedures can be performed (at 415) involving the user equipment, the MME, and the VLR. At this point, the association for the user equipment is operating correctly and one or more mobile-originated and/or mobile-terminated SMS messages may be successfully transmitted (at 420) between the user equipment and an SMS message serving center (SMSC).

In the illustrated embodiment, data stored at the MME is corrupted and/or lost (at 425). For example, the SGs association data may not be present on the MME. For another example, the SGs association data may be present but no corresponding subscriber record may be available on the MME, e.g., the indicator "Subscriber Data Confirmed by HSS" may have a value "Not Confirmed." In the conventional approach, if a MT-SMS arrives (at 430, 435) over the SGs interface with no indication of establishment of SGs Association (no SGs Association Data), the MME ignores the received message if there is no SGs association for the UE at the MME. The MME may also ignore the received message if the MME receives an SGsAP-DOWNLINK-UNITDATA message from the VLR for a UE for which there is no SGs association. In this case, upon timeout, the SMS-MT requests will be retried by the VLR (based on provisioning) and if still no response, the VLR sends a Failure Report to the SMS service center and releases the connection. Since the MME does not send a NACK for failure to the VLR, the VLR association state won't be updated and retries will mostly likely be through SGs interface again (and fail again).

The method 400 therefore implements an alternative embodiment that allows the VLR to take a corrective action such as re-registering the user equipment with the MME to recover the association status. In the illustrated embodiment, when SGs association data is not present on the MME, the MME may notify (at 440) the VLR by sending a Release Request to VLR to indicate that call is not successful due to SGs Association State being SGs-NULL (e.g., due to IMSI detached for EPS and non-EPS services). For example, if the MME receives an SGsAP-DOWNLINK-UNITDATA message from the VLR for a UE for which there is no SGs association, then if the "MME-Reset" restoration indicator at the MME is set to "false", the MME may ignore the received message and return an SGsAP-RELEASE-REQUEST message to VLR indicating the SGs cause information element value "IMSI detached for EPS and non-EPS services". If the "MME-Reset" restoration indicator at the MME is set to "true", the MME can ignore the received message and return an SGsAP-RELEASE-REQUEST message to VLR indicating the SGs cause information element value "IMSI detached for EPS and non-EPS services due to MME Reset/

On the VLR side, on receiving SGsAP-RELEASE-REQUEST message with SGs cause information element value "IMSI detached for EPS and non-EPS services", the VLR may perform various actions. For example, if SGs cause information element value is "IMSI detached for EPS and non-EPS services", the VLR may mark the "Confirmed by Radio Contact" restoration indicator to "false" for the SGs association for this mobile unit and set the state of the SGs association to the SGs-NULL state. If SGs cause information element value is "IMSI detached for EPS and non-EPS services due to MME Reset", the VLR can either (1) mark the "Confirmed by Radio Contact" restoration indicator to "false" for the SGs association for this IE and set the state of the SGs association to the SGs-NULL state or (2) keep the 'Confirmed by Radio Contact' restoration indication and the state of all the SGs associations containing the restarted MME unchanged. In one embodiment, the option to not set the 'Confirmed by Radio Contact' restoration indicator to 'false' in all the associations containing the restarted MME may reduce subsequent paging signaling the VLR can initiate by avoiding a complete search of the UE on the entire VLR area. If the "Confirmed by Radio Contact" restoration indicator is "false" the VLR may send future paging messages on both the SGs and the A/Iu interface.

Alternatively, if an SMS-MT arrives (at 430, 435) over the SGs interface with SGs Association Data present but no corresponding subscriber record (e.g., during Paging Procedure), the MME may accept the SGsAP-PAGING-REQUEST messages in any state of the SGs association apart from SGs-NULL. When a MME receives a SGs-PAGING-REQUEST message from a VLR, the MME may first check if the mobile unit is known by the MME. If a subscriber record cannot be found (IMSI unknown), the message may be handled based on whether "MME-Reset" restoration indicator at the MME is set. If not set, SGsAP-PAGING-REJECT message is sent to the VLR indicating in the SGs cause information element "IMSI unknown". In the illustrated embodiment, for a downlink Unitdata Request, the MME may send a Release Request to VLR to indicate that call is not successful due to unknown subscriber (with SGs cause information element "IMSI unknown"), and wait for next attach or combined tracking area update which can trigger the IMSI info retrieval from HSS. By using an association state update, the MSC/VLR may be able to make an intelligent decision to retry using other interfaces (A/Iu/Gs), e.g. until next non-eps attach reinstates the SGs association. This may help improve call success rate during abnormal scenarios.

In one embodiment, when a SGs association for the UE exists but Subscriber Data is not confirmed by HSS, the MME and/or VLR may operate as follows. If the MME receives an SGsAP-DOWNLINK-UNITDATA message from the VLR for a UE for which SGs association exists but the indicator "Subscriber Data Confirmed by HSS" is "Not Confirmed", then the MME may ignore the received message and return an SGsAP-RELEASE-REQUEST message to VLR indicating the SGs cause information element value "IMSI unknown." On the VLR side, on receiving SGsAP-RELEASE-REQUEST message with SGs cause information element "IMSI unknown", VLR can mark the "Confirmed by Radio Contact" restoration indicator to "false" for the SGs association for this IE and set the state of the SGs association to the SGs-NULL state. If the "Confirmed by Radio Contact" restoration indicator is "false" the VLR may send future paging messages on both the SGs and the A/Iu interface.

In one embodiment, when the SGs association is established and a circuit-switched (CS) call is coming from the CS domain, the UE may be paged through the packet-switched (PS) domain. On reception of the paging message with the "CS domain" indication, the UE's behavior may depend on the existence of an NAS signaling connection. If the UE is in EMM Connected mode, the UE can wait for the user to decide whether to accept the CS call. From the network viewpoint, this time period for the UE to accept the CS call is guarded by the CFNRy timer (usually 30~60 seconds). During this period, the caller may drop the call before the call is connected. (e.g. the caller drops the call after waiting for 15 seconds, while the callee accepts the call after 20 seconds). There are some disadvantages when this happens. First, from the user's perspective, when the user accepts the incoming call, the call may not be established. At the same time, the current PS services may be suspended (e.g. the DTM is not supported in the target network). Second, from the network's point of view, the whole procedure to redirect the UE to 2G/3G is useless.

Release request messages including the information element indicating a cause can be used to address these drawbacks in the conventional practice. In one embodiment, when the MSC receives the call release message (e.g. REL) before reception of the paging response from the UE via the A or Iu interface, the MSC sends a Release Request message through the SGs interface to the MME with SGs Cause Value '14' (Normal Clearing, CSFB call). Later, if the UE answers the call and sends the Extended Service Request message with CSFB response to the MME, the MME can reject the Extended Service Request message.

In operation, one embodiment of the release procedure may proceed as follows. When the VLR determines that there are no more NAS messages to be exchanged between the VLR and the UE, the VLR may send the SGsAP-RELEASE-REQUEST message to the MME, including the IMSI of the UE for which there are no more NAS messages to be tunneled. The VLR could also include SGsCause to provide cause information if available: For normal resource clearing due to completion of SMS transaction, SGs Cause Value '0' (Normal, Unspecified) may be used. For resource clearing due to CSFB call, SGs Cause Value '14' (Normal Clearing, CSFB Call) may be used. For embodiments that provide and support SMS transport, the VLR can send the SGsAP-RELEASE-REQUEST message when the SMS transaction is complete (reception of a CP-ACK message for the MO case, sending of a CP-ACK message for the MT case), upon reception of a CP-ERROR message, abort of SMS transaction by upper layers, or upon some error cases such as TC1 expiry. This indication can be used by the MME to control the release of the NAS signaling connection with the UE indicated in the SGsAP-RELEASE-REQUEST message. Upon receiving SGsAP-RELEASE-REQUEST message from the VLR, an NAS signaling connection may be released, and EMM context may be returned to EMM-IDLE mode. If SGsCause is not included in the SGsAP-RELEASE-REQUEST message, handling may be the same as SGs Cause Value '0' (Normal, unspecified).

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising: determining, in response to a non-access stratum (NAS) message that is associated with user equipment and transmitted between a mobility management entity and a visiting location register, availability of information identifying said user equipment or availability of information identifying an association between the mobility management entity and the visiting location register for said user equipment; generating a response message in response to determining that said information identifying said user equipment or the association is not available, wherein the response message includes information indicating a message type, an identifier of a mobile unit associated with the NAS message, and a cause associated with generating the response message; and transmitting the response message.

2. The method of claim 1, wherein generating the response message comprises generating a response message including information elements including bit sequences that indicate a message type, an international mobile subscriber identifier, and a cause of an error that leads to generation of the response message.

3. The method of claim 1, wherein generating the response message comprises detecting an error at the visiting location register following reception of the NAS message from the mobility management entity and generating the response message to signal the error to the mobility management entity, wherein the error is caused by unavailability of said information identifying said user equipment or said information identifying the association.

4. The method of claim 3, wherein detecting the error comprises determining that information indicating the association between the visiting location register and the mobility management entity for the mobile unit is not available at the visiting location register.

5. The method of claim 3, wherein detecting the error comprises determining that the visiting location register is unable to determine the identity of the mobile unit.

6. The method of claim 1, wherein generating the response message comprises detecting an error at the mobility management entity following reception of the NAS message from the visiting location register and generating the response message to signal the error to the visiting location register, wherein the error is caused by unavailability of said information identifying said user equipment or said information identifying the association.

7. The method of claim 6, wherein detecting the error comprises determining that information indicating the association between the mobility management entity and the visiting location register for the mobile unit is not available at the mobility management entity.

8. The method of claim 6, wherein detecting the error comprises determining that the mobility management entity is unable to determine the identity of the mobile unit.

9. The method of claim 1, wherein generating the response message comprises generating a response message requesting release of an NAS signaling connection between the mobility management entity and the visiting location register.

10. The method of claim 1, wherein generating the response message comprises generating the response message at a mobile switching center in response to receiving a call release message prior to reception of the paging response from the mobile unit associated with the call release message, and wherein transmitting the response message comprises transmitting the response message from the mobile switching center to the mobility management entity.

11. A method, comprising: receiving, in response to a non-access stratum (NAS) message transmitted between a mobility management entity and a visiting location register, a response message including information indicating a message type, an identifier of a mobile unit associated with the NAS message, and a cause associated with generating the response message, wherein the cause indicates unavailability of information identifying said user equipment or unavailability of information identifying an association between the mobility management entity and the visiting location register for said user equipment; and performing at least one corrective action for at least one of the mobility management entity or the visiting location register based on the cause indicated in the response message.

12. The method of claim 11, wherein receiving the response message comprises receiving a response message including information elements including bit sequences that indicate a message type, an international mobile subscriber identifier of the mobile unit, and a cause of an error that leads to generation of the response message.

13. The method of claim 11, wherein receiving the response message comprises receiving the response message at the mobility management entity in response to the visiting location register detecting an error following reception of the NAS message from the mobility management entity, wherein the error is caused by unavailability of information identifying said user equipment or information identifying the association between the mobility management entity and the visiting location register for said user equipment.

14. The method of claim 13, wherein receiving the response message comprises receiving the response message in response to the visiting location register determining that information indicating the association between the visiting location register and the mobility management entity for the mobile unit is not available at the visiting location register.

15. The method of claim 13, wherein receiving the response message comprises receiving the response message in response to the visiting location register being unable to determine the identity of the mobile unit.

16. The method of claim 11, wherein receiving the response message comprises receiving the response message at the visiting location register in response to the mobility management entity detecting an error following reception of the NAS message from the visiting location register, wherein the error is caused by unavailability of information identifying said user equipment or information identifying the association between the mobility management entity and the visiting location for said user equipment.

17. The method of claim 16, wherein receiving the response message comprises receiving the response message in response to the mobility management entity determining that information indicating the association between the mobility management entity and the visiting location register for the mobile unit is not available at the mobility management entity.

18. The method of claim 16, wherein receiving the response message comprises receiving the response message in response to the mobility management entity being unable to determine the identity of the mobile unit.

19. The method of claim 11, wherein performing said at least one corrective action comprises at least one of re-registering the association or establishing a new association between the mobility management entity and the visiting location register.

20. The method of claim 11, wherein receiving the response message comprises receiving the response message at the mobility management entity from a mobile switching center in response to the mobile switching center receiving a call release message prior to reception of the paging response from the mobile unit associated with the call release message.

* * * * *

UNITED STATES PATENT AND TRADEMARK OFFICE
CERTIFICATE OF CORRECTION

PATENT NO.      : 8,948,753 B2
APPLICATION NO. : 12/824695
DATED           : February 3, 2015
INVENTOR(S)     : Jennifer J. N. Liu et al.

It is certified that error appears in the above-identified patent and that said Letters Patent is hereby corrected as shown below:

In the Claims

Column 16, Line 22, Claim 16, please change "visiting location for said user equipment" to
-- visiting location register for said user equipment --

Signed and Sealed this
Twenty-third Day of June, 2015

Michelle K. Lee
*Director of the United States Patent and Trademark Office*